United States Patent Office 3,338,914
Patented Aug. 29, 1967

3,338,914
PYRIDYL-2-PHENYLCYCLOALKENES AND
PROCESSES FOR THEIR PREPARATION
Daniel Lednicer, Kalamazoo, Mich., assignor to the Upjohn Company, Kalamazoo, Mich., a corporation of Delaware
No Drawing. Filed May 27, 1964, Ser. No. 370,672
19 Claims. (Cl. 260—297)

This invention relates to novel polycyclic organic compounds and is more particularly concerned with novel pyridyl-2-phenylbenzocycloalkenes and derivatives thereof, and acid addition salts and quaternary ammonium salts thereof and with processes for their preparation.

The novel compounds of the invention are selected from the class consisting of:

(a) Compounds having the formula

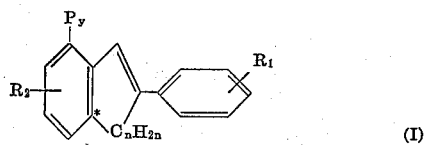
(I)

wherein —$C_nH_{2n}$—, in which $n$ is an integer from 1 to 6, inclusive, represents an alkylene radical and separates the carbon atom carrying the phenyl radical from the carbon atom marked with an asterisk by from 1 to 2 carbon atoms, inclusive, Py is selected from the class consisting of 2-pyridyl, 3-pyridyl, and 4-pyridyl, $R_1$ represents at least one substituent selected from the class consisting of hydrogen, lower-alkyl and halogen, and $R_2$ represents at least one substituent selected from the class consisting of hydrogen, lower-alkyl, lower-alkenyl, trifluoromethyl, lower - alkoxy, lower-alkenyloxy, lower - alkylenedioxy, cycloalkoxy from 4 to 7 carbon atoms, inclusive, halogen, and lower-alkylmercapto;

(b) The pharmacologically acceptable acid addition salts thereof; and (c) The quaternary ammonium salts of the compounds of the above formula wherein the anion of the quaternary salt is that of a pharamacologically acceptable acid.

The alkylene radical —$C_nH_{2n}$— which forms part of the ring structure of the compound (I) contains from 1 to 6 carbon atoms, inclusive, but not more than 2 of the carbon atoms of the alkylene radical can be ring carbon atoms in the compound (I). In other words, the alkylene radical —$C_nH_{2n}$— can have either of the following structures:

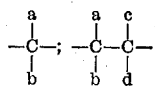

wherein $a$, $b$, $c$ and $d$ represent hydrogen or lower-alkyl, provided that the total number of carbon atoms in the alkylene radical is not greater than 6. Examples of such —$C_nH_{2n}$— alkylene radicals are methylene, isopropylidene, butylidene, ethylene, 1,2-dimethylethylene, 1-ethylethylene, 1-butylethylene, and the like.

The term "lower-alkyl" means an alkyl group containing from 1 to 8 carbon atoms, inclusive, such as methyl, ethyl propyl, butyl, pentyl, hexyl, heptyl, octyl, and isomeric forms thereof. The term "lower-alkenyl" means an alkenyl group containing from 3 to 8 carbon atoms, inclusive, such as allyl, butenyl, pentenyl, hexenyl, heptenyl, octenyl, and isomeric forms thereof. The term "lower-alkoxy" means an alkoxy group containing from 1 to 8 carbon atoms, inclusive, such as methoxy, ethoxy, propoxy, butoxy, pentyloxy, hexyloxy, heptyloxy, octyloxy, and isomeric forms thereof. The term "lower-alkenyloxy" means an alkenyloxy group containing from 3 to 8 carbon atoms, inclusive, such as allyloxy, butenyl-oxy, pentenyloxy, hexenyloxy, heptenyloxy, octenyloxy, and isomeric forms thereof. The term "cycloalkoxy from 4 to 7 carbon atoms, inclusive" means cyclobutoxy, cyclopentyloxy, cyclohexyloxy, and cycloheptyloxy. The term "halogen" is inclusive of fluorine, chlorine, bromine, and iodine. The term "lower-alkylenedioxy" means an alkylenedioxy group containing from 1 to 8 carbon atoms, inclusive, such as methylenedioxy, ethylenedioxy, propylenedioxy, butylenedioxy, pentylenedioxy, hexylenedioxy, heptylenedioxy, octylenedioxy, and isomeric forms thereof. The term "lower-alkylmercapto" means an alkylmercapto group containing from 1 to 8 carbon atoms, inclusive, such as methylmercapto, ethylmercapto, propylmercapto, butylmercapto, pentylmercapto, hexylmercapto, heptylmercapto, octylmercapto, and isomeric forms thereof.

The acid addition salts of the invention comprise the salts of the compounds having the Formula I with pharmacologically acceptable acids such as sulfuric, hydrochloric, nitric phosphoric, lactic, benzoic, methanesulfonic, p-toluenesulfonic, salicylic, acetic, propionic, maleic, tartaric, citric, cyclohexanesulfamic, succinic, nicotinic, ascorbic acids, and the like.

The quaternary ammonium salts of the invention are the salts obtained by reacting the free bases having the Formula I with quaternating agents, for example, lower-alkyl halides, lower-alkenyl halides, di(lower-alkyl) sulfates, aralkyl halides, lower-alkyl arylsulfonates, and the like. The terms "lower-alkyl" and "lower-alkenyl" have the meaning hereinbefore defined. The term "aralkyl" means an aralkyl group containing from 7 to 13 carbon atoms, inclusive, such as benzyl, phenethyl, phenylpropyl, benzhydryl, and the like. The term "lower-alkyl arylsulfonates" means the esters formed from lower-alkyl alcohols and arylsulfonic acids such as benzenesulfonic, toluenesulfonic, xylenesulfonic, and like acids. Examples of quaternary salts of the compounds of Formula I are the methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl toluenesulfonate, ethyl toluenesulfonate, and the like.

The novel compounds of the invention, including the free bases of Formula I, the acid addition salts thereof, and the quaternary ammonium salts thereof, possess pharmacological activity. Illustratively, the compounds of the invention are useful as antifertility agents in mammals and birds, and as fungicidal agents.

The antifertility activity of the compounds of the invention is illustrated by that of the compounds 1-(3-pyridyl)- and 1-(4-pyridyl)-2-phenyl-6-methoxy-3,4-dihydronaphthalene which exhibit oral antifertility activity at a dose of 0.5 mg./kg. when tested in rats using the method described by Duncan et al., Proc. Soc. Exp. Biol. Med. 112, 439–442, 1963.

For purposes of administration to mammals, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parenteral administration.

The novel compounds of the invention are valuable for animal pest control. For example, the compounds of the invention are formulated in combination with baits and/or attractants and placed in feeding stations accessible to undesirable rodents and other small animals including Canidae such as coyotes, foxes, wolves, jackals, and wild dogs and birds such as starlings, gulls, redwing blackbirds, pigeons, and the like, thus reducing hazards to aviation by their presence on runways and in the vicinity of airfields, the spread of disease, and destruction to property in both rural and urban areas.

In addition to their pharmacological activity, the compounds of the invention are also useful as intermediates. For example, the compounds of the Formula I can be reacted with fluosilicic acid to form the fluosilicate salts which in dilute aqueous solution are effective mothproofing agents as more fully disclosed in U.S. Patents 2,075,359 and 1,915,334.

The compounds of the invention having the Formula I can be prepared by reacting the appropriately substituted ketone having the following formula:

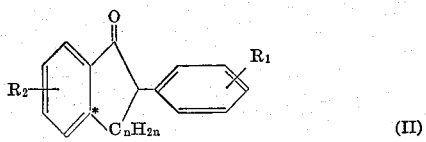

wherein $R_1$, $R_2$, and $-C_nH_{2n}-$ have the significance above defined, with the appropriate pyridyl lithium compound, to obtain a carbinol having the formula:

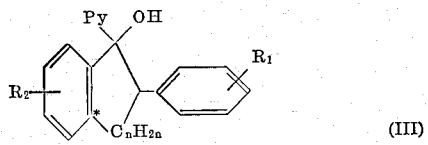

wherein $R_1$, $R_2$, Py, and $-C_nH_{2n}-$ have the significance hereinbefore defined; and subsequently converting the carbinol (III) to the desired compound (I) by dehydration.

The reaction between the ketone (II) and the pyridyl lithium compound is carried out advantageously in the presence of an inert solvent under anhydrous conditions. Suitable inert solvents include diisopropyl ether, diisobutyl ether, dibutyl ether, tetrahydrofuran, and the like. Preferably, the reaction is carried out at temperatures within the range of about $-80°$ C. to about $0°$ C. The reaction time varies within wide limits according to the temperature at which the reaction is conducted. Generally speaking, it is desirable to employ a reaction time of the order of 30 minutes to 2 hours.

The carbinol (III) can be isolated from the reaction mixture by conventional procedures, for example, by decomposing the reaction mixture with water, ammonium chloride, and the like, followed by separation of the organic layer and removal of solvent therefrom or by extracting the organic layer with aqueous acid, making the acid extract basic, and isolating the product which separates.

The carbinol (III) can be converted to the desired compound (I) by dehydration. The dehydration can be effected by heating the compound (III) in an inert solvent such as benzene, toluene, xylene, and the like, which forms an azeotrope with water, in the presence of a strong acid such as hydrochloric, sulfuric, p-toluenesulfonic acids, and the like. The water which is formed in the dehydration is removed from the reaction mixture azeotropically. There is thereby obtained a solution of the desired compound (I) from which the latter can be isolated by evaporation or other conventional procedures.

The carbinols having the Formula III in addition to being useful as intermediates in the preparation of the corresponding compounds (I) also possess pharmacological activity. Illustratively, the compounds of the Formula III, which can exist in either the form of the free bases or in the form of acid addition and quaternary ammonium salts, are useful as antifertility agents in mammals and birds, and as fungicidal agents.

The ketones having the Formula II which are employed as starting materials in the above process can be prepared by methods known in the art. For example, the compounds having the Formula II which are 1-indanones, i.e., wherein $-C_nH_{2n}-$ represents methylene or alkyl-substituted methylene, can be prepared by the procedures described in Belgian Patent 612,512. The compounds having the Formula II which are 1,2,3,4-tetrahydro-1-naphthalenones ($\alpha$-tetralones), i.e., wherein $-C_nH_{2n}-$ represents ethylene or alkyl-substituted ethylene, can be prepared by the procedures described in French Patent 1,343,580.

Said 1,2,3,4-tetrahydro-1-naphthalenones wherein $$-C_nH_{2n}-$$

represents ethylene can also be prepared by a variation of the process described in the aforesaid French patent, which variation is illustrated by the following reaction scheme:

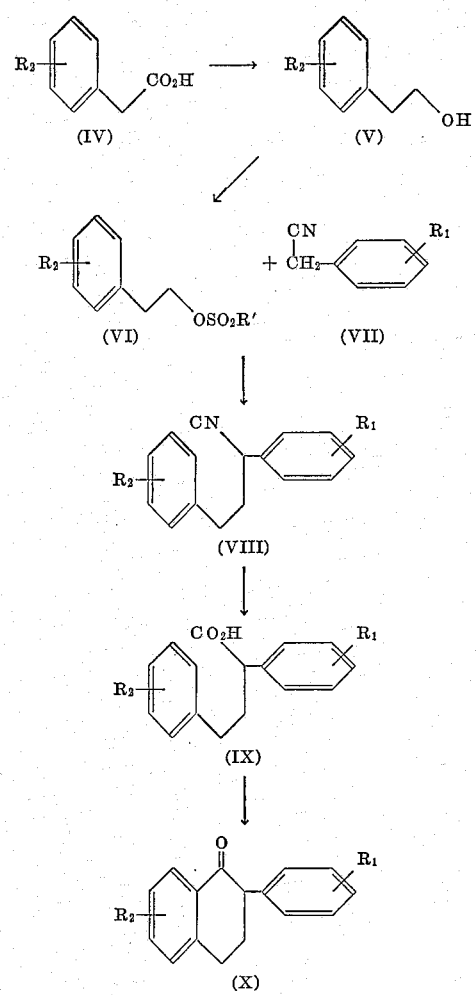

In the above formulae $R_1$ and $R_2$ have the significance hereinbefore defined, and R' represents lower-alkyl as hereinbefore defined or aryl from 6 to 12 carbon atoms, inclusive, such as phenyl, tolyl, xylyl, naphthyl, biphenylyl, and the like.

In the above reaction sequence the appropriately substituted phenylacetic acid (IV) is reduced to the corresponding phenethyl alcohol (V) using reducing agents well-known in the art for the reduction of carboxylic acids to primary alcohols. Illustrative of the reducing agents which can be employed are lithium aluminum hydride, dibutylaluminum hydride, and the like. The phenethyl alcohol (V) so obtained is then converted to the corresponding sulfonate (VI) by reaction with the appropriate hydrocarbon sulfonyl halide R'SO$_2$Hal wherein R' is as hereinbefore defined and Hal represents halogen, preferably chlorine or bromine. The sulfonate (VI) is then condensed with the appropriately substituted benzyl cyanide (VII) to form the corresponding 2,4-diphenylbutyronitrile (VIII). The condensation is advantageously carried out by bringing the reactants together in an inert solvent in the presence of a base such as sodium hydride, lithium hydride, potassium hydride, and the like. Inert solvents which can be used in the condensation include benzene, toluene, xylene, diethyl ether, dimethylformamide, tetrahydrofuran, dioxane, and the like. The butyronitrile (VIII) so obtained is then hydrolyzed to the corresponding acid (IX) using procedures conventional in the art for the hydrolysis of nitriles, for example, by heating under reflux in the presence of aqueous mineral acid such as sulfuric acid, until hydrolysis is substantially complete. The acid (IX) is then cyclized to the required $\alpha$-tetralone (X) in the presence of a Lewis acid, using the general procedure described by Fieser and Hershberg, J. Am. Chem. Soc. 61, 1272, 1939. The term "Lewis acid" is well known in the art and is defined by Fieser and Fieser, Organic Chemistry, third edition, p. 138 (Reinhold, 1956). Examples of such compounds are hydrogen fluoride, boron trifluoride, arsenic trifluoride, phosphorus pentachloride, phosphorus pentafluoride, titanium tetrafluoride, concentrated sulfuric acid, polyphosphoric acid, and the like.

Representative of the 1-indanones and $\alpha$-tetralones of the Formula II which can be employed in the process of the invention are:

2-p-tolyl-,
2-phenyl-6-methoxy-,
2-phenyl-5-methoxy-,
2-(p-chlorophenyl)-,
2-(p-fluorophenyl)-,
3-methyl-2-phenyl-,
3-propyl-2-(p-tolyl)-,
2-phenyl-5-methylmercapto-,
2-phenyl-5-allyloxy-,
2-phenyl-5-trifluoromethyl-,
2-phenyl-5,6-methylenedioxy-,
2-phenyl-5,6-dichloro-, and
2-phenyl-6-(1,3-dimethylbutyl)-1-indanone; and
2-phenyl-7-amyl-,
2-phenyl-6-bromo-,
2-phenyl-8-chloro-5-methoxy-,
2-phenyl-6-allyl-7-methoxy-,
2-phenyl-7-methylmercapto-,
2-phenyl-6-trifluoromethyl-,
2-phenyl-3-methyl-,
2-phenyl-3-ethyl-,
2-(2-bromophenyl)-,
2-(3-chlorophenyl)-,
2-p-tolyl-, and
2-phenyl-6-allyloxy-1,2,3,4 - tetrahydro - 1 - naphthalenone.

The acid addition salts of the compounds of the invention having the Formulas I and III can be prepared by methods well known in the art. For example, the acid addition salts of the invention can be prepared by reacting a free base having the Formula I or III with a pharmacologically acceptable acid, as hereinbefore exemplified, in the presence of an inert solvent such as methanol, ethanol, diethyl ether, ethyl acetate, and the like.

The quarternary ammonium salts of the invention can be prepared by reacting a free base of the Formula I or III with a quarternating agent, for example, an alkyl halide such as methyl iodide, ethyl chloride, isopropyl bromide, and the like, an alkenyl halide such as allyl chloride, allyl bromide, and the like, a dialkyl sulfate such as dimethyl sulfate, diethyl sulfate, and the like, an aralkyl halide such as benzyl bromide, benzhydryl chloride, phenethyl bromide, and the like, or an alkyl arylsulfonate such as methyl p-toluenesulfonate, and the like. Preferably the reaction is effected by bringing the reactants together in the presence of an inert solvent such as acetonitrile, acetone, methanol, ethanol, tetrahydrofuran, dioxane, dimethylformamide, and the like. Generally speaking, the desired quaternary salt separates readily from the reaction mixture and can be isolated by filtration. Purification of the quaternary salt can be effected by conventional methods, for example, by recrystallization.

The anion of the quaternary ammonium salt obtained as described above can be exchanged for any other desired anion, e.g., the anions of the various acids enumerated previously, by conventional procedures. For example, any of the quaternary ammonium salts of the invention can be converted to the corresponding quaternary ammonium hydroxide, illustratively by treating with silver oxide, and the hydroxide so obtained is reacted with the appropriate acid to obtain the desired quaternary ammonium salt.

The following preparation and examples illustrate the best method contemplated by the inventor for carrying out his invention, but are not to be construed as limiting the scope thereof.

PREPARATION

*2-phenyl-6-methoxy-1,2,3,4-tetrahydro-1-naphthalenone*

A solution of 100 g. of m-methoxyphenylacetic acid in 600 ml. of diethyl ether was added to a mechanically stirred suspension of 34 g. of lithium aluminum hydride in 30 ml. of diethyl ether at such a rate as to produce a vigorous reflux. Following this, the mixture was heated under reflux for 30 minutes, and then cooled in an ice bath. The reaction mixture was then cautiously decomposed with 50 ml. of water. There was then added in turn 500 ml. of saturated aqueous ammonium chloride solution and 300 ml. of 2.5 N hydrochloric acid. The organic layer was separated, washed twice with water, once with saturated aqueous sodium chloride solution, and dried by percolation through anhydrous sodium sulfate.

The oil (91.1 g.) which remained when the solvent was removed under vacuum was distilled through a short Vigreux column. There was obtained 84.5 g. of m-methoxyphenethyl alcohol having a boiling point of 99–102° C. at a pressure of 1 mm. of mercury.

A solution of 15.2 g. of the m-methoxyphenethyl alcohol in 75 ml. of pyridine was cooled in an ice-methanol bath. Over a period of 10 minutes 15.2 g. of methanesulfonyl chloride was added to the solution with stirring. Following additional stirring for 1 hour in the cold, the mixture was diluted to 600 ml. with ice and water. The precipitated oil was extracted with diethyl ether, and the ethereal solution was in turn washed with water, 2.5 N hydrochloric acid, water, and saturated aqueous sodium chloride solution. The solvent was removed to afford 22.27 g. of m-methoxyphenethyl methanesulfonate as a viscous oil.

To an ice cooled, well stirred solution of 11.7 g. of phenylacetonitrile in 50 ml. of dry dimethylformamide and 25 ml. of dry toluene there was added 4.50 g. of sodium hydride (53% suspension in mineral oil). Following stirring for 1 hour under nitrogen, there was added 22.27 g. of m-methoxyphenethyl methanesulfonate (prepared as described above) in 30 ml. of toluene. The mixture was then allowed to stir overnight at about 25° C. The bulk of the solvent was removed in vacuo, and water and diethyl ether were added. The organic layer was washed in turn with water and saturated aqueous sodium chloride solution, and dried by percolation through anhydrous sodium sulfate. The oil which remained when the solvent was removed was distilled at a pressure of 1–2 mm. of mercury through a Vigreaux column. There was obtained 6.03 g. of forerun, B.P. 52–170° C. (mainly 54–64° C.) and 18.79 g. of 4-(m- methoxyphenyl)-2-phenylbutyronitrile having a boiling point of 170–190° C.

A mixture of 18.79 g. of 4-(m-methoxyphenyl)-2-phenylbutyronitrile (prepared as described above) and 20 g. of potassium hydroxide in 200 ml. of ethylene glycol was heated overnight at reflux. The resulting solution was allowed to cool, diluted with 600 ml. of water, and extracted once with diethyl ether. This extract was discarded. The aqueous layer was then acidified with concentrated hydrochloric acid and extracted well with diethyl ether. These last extracts were washed in turn with water and saturated aqueous sodium chloride solution, and dried by percolation through anhydrous sodium sulfate. The solution was taken to dryness in vacuo, the residue dissolved in dry benzene, and the solution again taken to dryness. 4-(m-methoxyphenyl)-2-phenylbutyric acid (16.29 g.) was obtained as a clear amorphous gum.

A solution of 16.29 g. of 4-(m-methoxyphenyl)-2-phenylbutyric acid so obtained and 12.7 g. of phosphorus pentachloride in 250 ml. of dry benzene was heated under reflux for 1 hour. The solution was then cooled in ice and 7.15 ml. of stannic chloride was added with stirring. Following 2.5 hours stirring at about 25° C. the two-phase mixture was poured into 250 ml. of 2.5 N hydrochloric acid. Following 0.5 hour stirring, the organic layer was separated, and washed in turn with 2.5 N hydrochloric acid, water, saturated aqueous sodium bicarbonate solution, water, and saturated aqueous sodium chloride solution. A crystalline solid remained when the solution was taken to dryness. This was recrystallized from methanol to afford 11.34 g. of 2-phenyl-6-methoxy-1,2,3,4-tetrahydro-1-naphthalenone, M.P. 113–116° C.; mixed M.P. with authentic material, 113.5–117° C.

Similarly, using the above procedure but replacing m-methoxyphenylacetic acid by 4-chlorophenylacetic acid, 3-bromophenylacetic acid, 3,4 - methylenedioxyphenyl-acetic acid, 4-trifluoromethylphenylacetic acid, 3-chloro-4-methylphenylacetic acid, 4-cyclobutoxyphenylacetic acid and 4-allylphenylacetic acid, there are obtained 7-chloro-, 6-bromo-, 6,7-methylenedioxy-, 7-trifluoromethyl-, 6-chloro-7-methyl-, 7-cyclobutoxy-, and 7-allyl-2-phenyl - 1,2,3,4-tetrahydro-1-naphthalenone, respectively.

Similarly, using the above procedure, but replacing phenylacetonitrile by p-fluorophenylacetonitrile, m-chlorophenylacetonitrile, p-methylphenylacetonitrile, m-ethylphenylacetonitrile, and o-propylphenylacetonitrile, there are obtained 2-p-fluorophenyl-, 2-m-chlorophenyl-, 2-p-tolyl-, 2-m-ethylphenyl-, and 2-o-propylphenyl-6-methoxy-1,2,3,4-tetrahydro-1-naphthalenone, respectively.

EXAMPLE 1

A. 1-hydroxy-6-methoxy-2-phenyl-1-(2-pyridyl)-1,2,3,4-tetrahydronaphthalene

Over a period of 20 minutes a solution of 3.16 g. of 2-bromopyridine in 30 ml. of diethyl ether was added with stirring to 26.5 ml. of freshly prepared 0.75 M butyl lithium in diethyl ether, while cooling the mixture in an ice-methanol bath. After an additional 20 minutes stirring, a solution of 5.28 g. of 2-phenyl-6-methoxy-1,2,3,4-tetrahydro-1-naphthalenone in 75 ml. of tetrahydrofuran was added over a period of 30 minutes with continued cooling. The mixture was then stirred for 1 hour and decomposed with 25 ml. of saturated aqueous ammonium chloride solution. The organic layer was separated, washed with water, and extracted with 250 ml. of 2.5 N hydrochloric acid. The precipitate which was obtained when the extract was made basic was recrystallized three times from aqueous methanol to yield 1.30 g. of 1-hydroxy-6-methoxy-2-phenyl-1-(2-pyridyl)-1,2,3,4-tetrahydronaphthalene having a melting point of 127 to 129.5° C.

Analysis.—Calcd. for $C_{22}H_{21}NO_2$: C, 79.73; H, 6.39; N, 4.23. Found: C, 79.80; H, 6.66; N, 4.09.

B. 1-(2-pyridyl)-2-phenyl-6-methoxy-3,4-dihydronaphthalene

A mixture of 2.58 g. of 1-hydroxy-6-methoxy-2-phenyl-1-(2-pyridyl)-1,2,3,4-tetrahydronaphthalene and 1.70 g. of p-toluenesulfonic acid in 100 ml. of toluene was heated at reflux under a Dean-Stark trap for 5 hours. The solvent was then evaporated under vacuum and the residue was dissolved in methylene chloride. This solution was washed with aqueous potassium carbonate solution and evaporated to dryness. The residual solid was recrystallized from methanol to yield 2.0 g. of 1-(2-pyridyl)-2-phenyl-6-methoxy-3,4-dihydronaphthalene having a melting point of 143 to 145° C.

Analysis.—Calcd. for $C_{22}H_{19}NO$: C, 84.31; H, 6.11; N, 4.47. Found: C, 84.19; H, 6.18; N, 4.53.

EXAMPLE 2

A. 1-hydroxy-6-methoxy-2-phenyl-1-(4-pyridyl)-1,2,3,4-tetrahydronaphthalene

To 23.5 ml. of 0.845 M butyl lithium in diethyl ether cooled in a solid carbon dioxide-acetone bath under a stream of nitrogen there was added, over 35 minutes, 3.16 g. of 4-bromopyridine in 60 ml. of diethyl ether. A solution of 5.0 g. of 2-phenyl-6-methoxy-1,2,3,4-tetrahydro-1-naphthalenone in 75 ml. of tetrahydrofuran was added with stirring to the resulting yellow gray suspension over 40 minutes. Following an additional 90 minutes stirring, the mixture was allowed to come to ice bath temperature over 1 hour. Saturated aqueous ammonium chloride solution (25 ml.) was then added. The organic layer was washed with water and saturated aqueous sodium chloride solution, and taken to dryness on a rotary evaporator. The residue was dissolved in diethyl ether and this solution was extracted with three 100-ml. portions of 2.5 N hydrochloric acid. The solid which was obtained when the solution was made basic was collected by filtration and recrystallized from aqueous methanol. There was obtained 2.56 g. of 1-hydroxy-6-methoxy-2-phenyl-1-(4-pyridyl)-1,2,3,4-tetrahydronaphthalene having a melting point of 183 to 185° C.

One further recrystallization gave an analytical sample, melting point 182 to 185° C.

Analysis.—Calcd. for $C_{22}H_{21}NO_2$: C, 79.73; H, 6.39; N, 4.23. Found: C, 79.65; H, 6.59; N, 4.57.

B. 1-(4-pyridyl)-2-phenyl-6-methoxy-3,4-dihydronaphthalene

A solution of 8.0 g. of 1-hydroxy-6-methoxy-2-phenyl-1-(4-pyridyl)-1,2,3,4-tetrahydronaphthalene and 3.3 g. of p-toluenesulfonic acid in 200 ml. of toluene was heated at reflux under a Dean-Stark trap for 4 hours. The product was isolated in the same manner as the 2-pyridyl compound of Example 1, part B, and recrystallized from methanol to give 3.75 g. of 1-(4-pyridyl)-2-phenyl-6-methoxy-3,4-dihydronaphthalene having a melting point of 130 to 133.5° C.

An analytical sample melting at 134 to 136.5° C. was obtained by further recrystallization from methanol.

Analysis.—Calcd. for $C_{22}H_{19}NO$: C, 84.31; H, 6.11. Found: C, 84.12; H, 6.39.

EXAMPLE 3

A. 1-hydroxy-6-methoxy-2-phenyl-1-(3-pyridyl)-1,2,3,4-tetrahydronaphthalene

Using the procedure described in Example 1, part A, but replacing 2-bromopyridine by 3-bromopyridine, there was obtained 1 - hydroxy - 6 - methoxy-2-phenyl-1-(3-pyridyl)-1,2,3,4-tetrahydronaphthalene in the form of an amorphous solid.

B. 1-(3-pyridyl)-2-phenyl-6-methoxy-3,4-dihydronaphthalene

Using the procedure described in Example 1, part B, 4.14 g. of 1-hydroxy-6-methoxy-2-phenyl-1-(3-pyridyl)-

1,2,3,4-tetrahydronaphthalene was dehydrated to yield 2.82 g. of 1-(3-pyridyl)-2-phenyl-6-methoxy-3,4-dihydronaphthalene in the form of a crystalline solid having a melting point of 136 to 139° C. after recrystallization from aqueous methanol. An analytical sample having a melting point of 137 to 140° C. was obtained by further recrystallization from aqueous methanol.

Analysis.—Calcd. for $C_{22}H_{19}NO$: C, 84.31; H, 6.11; N, 4.47. Found: C, 83.50; H, 6.13; N, 4.53.

EXAMPLE 4

A. *1-hydroxy-2-phenyl-1-(2-pyridyl)-1,2,3,4-tetrahydronaphthalene*

Using the procedure described in Example 1, part A, but replacing 2 - phenyl-6-methoxy-1,2,3,4-tetrahydro-1-naphthalenone by 2-phenyl-1,2,3,4-tetrahydro-1-naphthalenone, there is obtained 1-hydroxy-2-phenyl-1-(2-pyridyl)-1,2,3,4-tetrahydronaphthalene.

B. *2-phenyl-1-(2-pyridyl)-3,4-dihydronaphthalene*

Using the procedure described in Example 1, part B, but replacing 1 - hydroxy - 6-methoxy-2-phenyl-1-(2-pyridyl)-1,2,3,4 - tetrahydronaphthalene by 1-hydroxy-2-phenyl-1-(2-pyridyl)-1,2,3,4-tetrahydronaphthalene, there is obtained 2-phenyl-1-(2-pyridyl)-3,4-dihydronaphthalene.

Similarly, using the procedure described in Example 1, parts A and B, but replacing 2-phenyl-6-methoxy-1,2,3,4-tetrahydro-1-naphthalenone by the appropriate 1,2,3,4-tetrahydro-1-naphthalenone, there are obtained other 3,4-dihydronaphthalenes of the invention and the corresponding carbinols. Representative of the compounds so prepared are:

2-phenyl-7-amyl-,
2-phenyl-6-bromo-,
2-phenyl-8-chloro-5-methoxy-,
2-phenyl-6-allyl-7-methoxy-,
2-phenyl-7-methylmercapto-,
2-phenyl-6-trifluoromethyl-,
2-phenyl-3-methyl-,
2-phenyl-3-ethyl-,
2-(2-bromophenyl)-,
2-(3-chlorophenyl)-,
2-p-tolyl-,
2-phenyl-6-allyloxy-,
2-phenyl-7-chloro-,
2-phenyl-6-bromo-,
2-phenyl-6,7-methylenedioxy-,
2-phenyl-7-trifluoromethyl-,
2-phenyl-6-chloro-7-methyl-,
2-phenyl-7-cyclobutoxy-,
2-phenyl-7-allyl-, and
2-p-fluorophenyl-6-methoxy-1-(2-pyridyl)-3,4-dihydronaphthalene and the corresponding carbinols.

The corresponding 1-(3-pyridyl) and 1-(4-pyridyl) isomers of the above compounds can be prepared by employing 3-bromopyridine and 4-bromopyridine, respectively, in place of 2-bromopyridine in the procedure of Example 1, part A.

EXAMPLE 5

A. *3-hydroxy-2-phenyl-3-(2-pyridyl)-5-methoxyindane*

Using the procedure of Example 1, part A, but replacing 2 - phenyl - 6-methoxy-1,2,3,4-tetrahydro-1-naphthalenone by 2-phenyl-6-methoxy-1-indanone, there is obtained 3-hydroxy-2-phenyl-3-(2-pyridyl)-5-methoxyindane.

B. *2-phenyl-3-(2-pyridyl)-5-methoxyindene*

Using the procedure of Example 1, part B, but replacing 1 - hydroxy-6-methoxy-2-phenyl-1-(2-pyridyl)-1,2,3,4-tetrahydronaphthalene by 3 - hydroxy-2-phenyl-3-(2-pyridyl)-5-methoxyindane, there is obtained 2-phenyl-3-(2-pyridyl)-5-methoxyindene.

Similarly, using the procedure described in Example 1, parts A and B, but replacing 2-phenyl-6-methoxy-1,2,3,4-tetrahydro - 1 - naphthalenone by the appropriate 1-indanone, there are obtained other indenes of the invention and the corresponding carbinols. Representative of the compounds so prepared are:

2-p-tolyl-,
2-phenyl-6-methoxy-,
2-(p-chlorophenyl)-,
2-(p-fluorophenyl)-,
1-methyl-2-phenyl-,
1-propyl-2-(p-tolyl)-,
2-phenyl-6-methylmercapto-,
2-phenyl-6-allyloxy-,
2-phenyl-6-trifluoromethyl-,
2-phenyl-5,6-methylenedioxy-,
2-phenyl-5,6-dichloro-, and
2-phenyl-5-(1,3-dimethylbutyl)-3-(2-pyridyl)indene and the corresponding carbinols.

The corresponding 3-(3-pyridyl) and 3-(4-pyridyl) isomers of the above compounds can be prepared by employing 3-bromopyridine and 4-bromopyridine, respectively, in place of 2-bromopyridine in the procedure of Example 1, part A.

EXAMPLE 6

*1-(2-pyridyl)-2-phenyl-6-methoxy-3,4-dihydronaphthalene methiodide*

A solution of 1.0 g. of 1-(2-pyridyl)-2-phenyl-6-methoxy-3,4-dihydronaphthalene in 25 ml. of methyl iodide was allowed to stand at about 25° C. Within 15 minutes solid started to separate. At the end of 17 hours the excess reagent was removed on a rotary evaporator and the residue was recrystallized from acetonitrile. There was obtained 1.05 g. of 1-(2-pyridyl)-2-phenyl-6-methoxy-3,4,-dihydronaphthalene methiodide having a melting point of 224 to 226° C.

Analysis.—Calcd. for $C_{23}H_{22}INO$: C, 60.67; H, 4.87; I, 27.87. Found: C, 60.79; H, 5.61; I, 27.90.

EXAMPLE 7

*1-(3-pyridyl)-2-phenyl-6-methoxy-3,4-dihydronaphthalene methiodide*

Using the procedure described in Example 6, but replacing 1 - (2 - pyridyl)-2-phenyl-6-methoxy-3,4-dihydronaphthalene by 1-(3-pyridyl)-2-phenyl-6-methoxy-3,4-dihydronaphthalene, there was obtained 1-(3-pyridyl)-2-phenyl-6-methoxy-3,4-dihydronaphthalene methiodide in the form of a crystalline solid having a melting point of 238 to 241.5° C.

Analysis.—Calcd. for $C_{23}H_{22}INO$: C, 60.67; H, 4.87. Found: C, 60.56; H, 5.18.

Similarly, using the procedure described in Example 6, but replacing 1 - (2 - pyridyl)-2-phenyl-6-methoxy-3,4-dihydronaphthalene by 1-(4-pyridyl)-2-phenyl-6-methoxy-3,4-dihydronaphthalene, there was obtained 1-(4-pyridyl)-2-phenyl - 6 - methoxy-3,4-dihydronaphthalene methiodide in the form of a crystalline solid having a melting point of 285 to 286° C.

Analysis.—Calcd. for $C_{23}H_{22}INO$: C, 60.67; H, 4.87. Found: C, 60.85; H, 5.20.

Similarly, using the above procedure, other 1-(pyridyl)-3,4-dihydronaphthalenes and 3-(pyridyl)indenes of the invention, illustratively those named in Examples 4 and 5, are converted to the corresponding methiodides.

EXAMPLE 8

*1-(2-pyridyl)-2-phenyl-6-methoxy-3,4-dihydronaphthalene ethobromide*

Using the procedure described in Example 6, but replacing methyl iodide by ethyl bromide, there is obtained 1-(2-pyridyl)-2-phenyl-6-methoxy-3,4 - dihydronaphthalene ethobromide.

Similarly, by reacting other alkyl halides with 1-(2-pyridyl)-2-phenyl-6-methoxy-3,4-dihydronaphthalene according to the procedure of Example 6, there are obtained other quaternary ammonium salts of the invention.

EXAMPLE 9

*1-(4-pyridyl)-2-phenyl-6-methoxy-3,4-dihydronaphthalene methochloride*

A solution of 1 g. of 1-(4-pyridyl)-2-phenyl-6-methoxy-3,4-dihydronaphthalene methiodide in dimethylformamide is shaken with a slight excess of silver oxide until the precipitation of silver iodide is complete. The resulting mixture is filtered and the filtrate containing the corresponding quaternary ammonium hydroxide is neutralized by the addition of aqueous hydrochloric acid. The resulting mixture is evaporated to dryness to obtain 1-(4-pyridyl)-2-phenyl-6-methoxy - 3,4 - dihydronaphthalene methochloride.

Similarly, using the above procedure but replacing hydrochloric acid by other acids such as sulfuric acid, hydrobromic acid, phosphoric acid, acetic acid, methanesulfonic acid, and the like, there are obtained the corresponding quaternary ammonium salts.

In like manner, using the above procedure, the anion of any of the quaternary ammonium salts of the invention can be exchanged by any other desired anion by forming the corresponding quaternary ammonium hydroxide and reacting the latter with the appropriate acid.

EXAMPLE 10

*1-(2-pyridyl)-2-phenyl-6-methoxy-3,4-dihydronaphthalene hydrobromide*

To a solution of 1 g. of 1-(2-pyridyl)-2-phenyl-6-methoxy-3,4-dihydronaphthalene in 100 ml. of ether is added dropwise with stirring a slight excess of a 0.1 N ethereal solution of hydrogen bromide. The solid which separates is isolated by filtration, washed with diethyl ether, and dried. There is thus obtained 1-(2-pyridyl)-2-phenyl - 6-methoxy-3,4-dihydronaphthalene hydrobromide.

In like manner, employing any of the free bases of the invention and the appropriate acid, there are obtained the corresponding acid addition salts. Illustratively, using procedures analogous to that described above, the free bases of Examples 1 through 5 are converted to their acid addition salts with sulfuric, nitric, phosphoric, lactic, benzoic, methanesulfonic, p-toluenesulfonic, salicylic, acetic, propionic, malic, tartaric, citric, cyclohexanesulfamic, succinic, nicotinic, and ascorbic acids.

I claim:
1. A compound selected from the class consisting of
(a) compounds having the formula

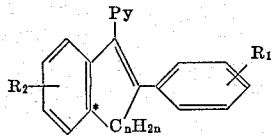

wherein —$C_nH_{2n}$—, in which $n$ is an integer from 1 to 6, inclusive, represents an alkylene radical and separates the carbon atom carrying the phenyl radical from the carbon atom marked with an asterisk by from 1 to 2 carbon atoms, inclusive, Py is selected from the class consisting of 2-pyridyl, 3-pyridyl, and 4-pyridyl, $R_1$ represents at least one substituent selected from the class consisting of hydrogen, lower-alkyl and halogen, and $R_2$ represents at least one substituent selected from the class consisting of hydrogen, lower-alkyl, lower-alkenyl, trifluoromethyl, lower-alkoxy, lower-alkenyloxy, lower-alkylenedioxy, cycloalkoxy from 4 to 7 carbon atoms, inclusive, halogen and lower-alkylmercapto;
(b) the pharmacologically acceptable acid addition salts thereof; and
(c) the quaternary ammonium salts of the compounds of the above formula wherein the anion of the quaternary salt is that of a pharmacologically acceptable acid.

2. An indene selected from the class consisting of
(a) compounds having the formula

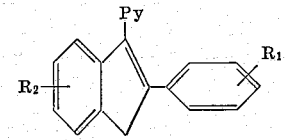

wherein Py is selected from the class consisting of 2-pyridyl, 3-pyridyl, and 4-pyridyl, $R_1$ represents at least one substituent selected from the class consisting of hydrogen, lower-alkyl and halogen, and $R_2$ represents at least one substituent selected from the class consisting of hydrogen, lower-alkyl, lower-alkenyl, trifluoromethyl, lower-alkoxy, lower-alkenyloxy, lower-alkylenedioxy, cycloalkoxy from 4 to 7 carbon atoms, inclusive, halogen, and lower-alkylmercapto;
(b) the pharmacologically acceptable acid addition salts thereof; and
(c) the quaternary ammonium salts of the compounds of the above formula wherein the anion of the quaternary salt is that of a pharmacologically acceptable acid.

3. A dihydronaphthalene selected from the class consisting of
(a) compounds having the formula

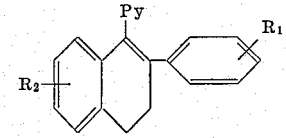

wherein Py is selected from the class consisting of 2-pyridyl, 3-pyridyl, and 4-pyridyl, $R_1$ represents at least one substituent selected from the class consisting of hydrogen, lower-alkyl and halogen, and $R_2$ represents at least one substituent selected from the class consisting of hydrogen, lower-alkyl, lower-alkenyl, trifluoromethyl, lower-alkoxy, lower-alkenyloxy, lower-alkylenedioxy, cycloalkoxy from 4 to 7 carbon atoms, inclusive, halogen, and lower-alkylmercapto;
(b) the pharmacologically acceptable acid addition salts thereof; and
(c) the quaternary ammonium salts of the compounds of the above formula wherein the anion of the quaternary salt is that of a pharmacologically acceptable acid.

4. A compound selected from the class consisting of 1 - (2 - pyridyl) - 2 - phenyl - 6 - methoxy - 3,4 - dihydronaphthalene and the salts thereof with pharmacologically acceptable acids.

5. 1 - (2 - pyridyl) - 2 - phenyl - 6 - methoxy - 3,4-dihydronaphthalene.

6. A compound selected from the class consisting of 1 - (4 - pyridyl) - 2 - phenyl - 6 - methoxy - 3,4 - dihydronaphthalene and the salts thereof with pharmacologically acceptable acids.

7. 1 - (4 - pyridyl) - 2 - phenyl - 6 - methoxy - 3,4 - dihydronaphthalene.

8. A compound selected from the class consisting of 1 - (3 - pyridyl) - 2 - phenyl - 6 - methoxy - 3,4-dihydronaphthalene and the salts thereof with pharmacologically acceptable acids.

9. 1 - (3 - pyridyl) - 2 - phenyl - 6 - methoxy - 3,4 - dihydronaphthalene.

10. 1 - (2 - pyridyl) - 2 - phenyl - 6 - methoxy - 3,4- dihydronaphthalene methiodide.

11. 1 - (3 - pyridyl) - 2 - phenyl - 6 - methoxy - 3,4 - dihydronaphthalene methiodide.

12. 1 - (4 - pyridyl) - 2 - phenyl - 6 - methoxy - 3,4 - dihydronaphthalene methiodide.

13. A compound selected from the class consisting of
(a) compounds having the formula

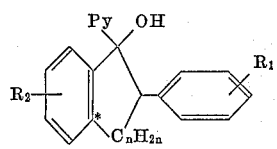

wherein —$C_nH_{2n}$—, in which $n$ is an integer from 1 to 6, inclusive, represents an alkylene radical and separates the carbon atom carrying the phenyl radical from the carbon atom marked with an asterisk by from 1 to 2 carbon atoms, inclusive, Py is selected from the class consisting of 2-pyridyl, 3-pyridyl, and 4-pyridyl, $R_1$ represents at least one substituent selected from the class consisting of hydrogen, lower-alkyl and halogen, and $R_2$ represents at least one substituent selected from the class consisting of hydrogen, lower-alkyl, lower-alkenyl, trifluoromethyl, lower-alkoxy, lower-alkenyloxy, lower-alkylenedioxy, cycloalkoxy from 4 to 7 carbon atoms, inclusive, halogen, and lower-alkylmercapto;

(b) the pharmacologically acceptable acid addition salts thereof; and (c) the quaternary ammonium salts of the compounds of the above formula wherein the anion of the quaternary salt is that of a pharmacologically acceptable acid.

14. An indane selected from the class consisting of
(a) compounds having the formula

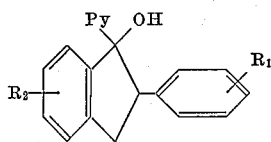

wherein Py is selected from the class consisting of 2-pyridyl, 3-pyridyl, and 4-pyridyl, $R_1$ represents at least one substituent selected from the class consisting of hydrogen, lower-alkyl and halogen, and $R_2$ represents at least one substituent selected from the class consisting of hydrogen, lower-alkyl, lower-alkenyl, trifluoromethyl, lower-alkoxy, lower-alkenyloxy, lower-alkylenedioxy, cycloalkoxy from 4 to 7 carbon atoms, inclusive, halogen, and lower-alkylmercapto;

(b) the pharmacologically acceptable acid addition salts thereof; and (c) the quaternary ammonium salts of the compounds of the above formula wherein the anion of the quaternary salt is that of a pharmacologically acceptable acid.

15. A tetrahydronaphthalene selected from the class consisting of
(a) compounds having the formula

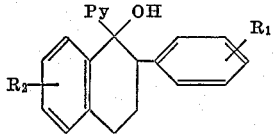

wherein Py is selected from the class consisting of 2-pyridyl, 3-pyridyl, and 4-pyridyl, $R_1$ represents at least one substituent selected from the class consisting of hydrogen, lower-alkyl and halogen, and $R_2$ represents at least one substituent selected from the class consisting of hydrogen, lower-alkyl, lower-alkenyl, trifluoromethyl, lower-alkoxy, lower-alkenyloxy, lower-alkylenedioxy, cycloalkoxy from 4 to 7 carbon atoms, inclusive, halogen, and lower-alkylmercapto;

(b) the pharmacologically acceptable acid addition salts thereof; and (c) the quaternary ammonium salts of the compounds of the above formula wherein the anion of the quaternary salt is that of a pharmacologically acceptable acid.

16. 1 - hydroxy - 6 - methoxy-2-phenyl-1-(2-pyridyl)-1,2,3,4-tetrahydronaphthalene.

17. 1 - hydroxy - 6 - methoxy-2-phenyl-1-(3-pyridyl)-1,2,3,4-tetrahydronaphthalene.

18. 1 - hydroxy - 6 - methoxy-2-phenyl-1-(4-pyridyl)-1,2,3,4-tetrahydronaphthalene.

19. A process for the preparation of a compound having the formula

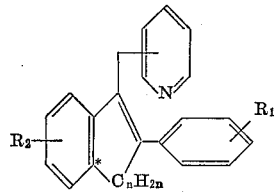

wherein —$C_nH_{2n}$—, in which $n$ is an integer from 1 to 6, inclusive, represents an alkylene radical and separates the carbon atom carrying the phenyl radical from the carbon atom marked with an asterisk by from 1 to 2 carbon atoms, inclusive, $R_1$ represents at least one substituent selected from the class consisting of hydrogen, lower-alkyl, and halogen, and $R_2$ represents at least one substituent selected from the class consisting of hydrogen, lower-alkyl, lower-alkenyl, trifluoromethyl, lower-alkoxy, lower-alkenyloxy, lower-alkylenedioxy, cycloalkyl from 4 to 7 carbon atoms, inclusive, halogen, and lower-alkylmercapto, which comprises reacting a ketone having the formula

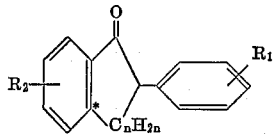

wherein $R_1$, $R_2$ and —$C_nH_{2n}$— are as defined above, with the appropriate pyridyl lithium in the presence of an inert organic solvent to obtain the corresponding carbinol and subjecting the latter to dehydration.

No references cited.

WALTER A. MODANCE, *Primary Examiner.*
ROBERT T. BOND, *Assistant Examiner.*

CERTIFICATE OF CORRECTION

Patent No. 3,338,914                                    August 29, 1967

Daniel Lednicer

It is hereby certified that error appears in the above numbered patent requiring correction and that the said Letters Patent should read as corrected below.

Column 1, lines 18 to 23, the formula should appear as shown below instead of as in the patent:

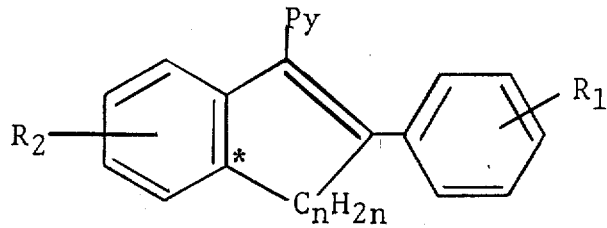

column 2, line 22, after "maleic," insert -- malic, --.

Signed and sealed this 24th day of December 1968.

(SEAL)
Attest:

EDWARD M. FLETCHER, JR.                    EDWARD J. BRENNER
Attesting Officer                          Commissioner of Patents